(No Model.)
G. KRAMER.
CAR COUPLING.
No. 358,280. Patented Feb. 22, 1887.
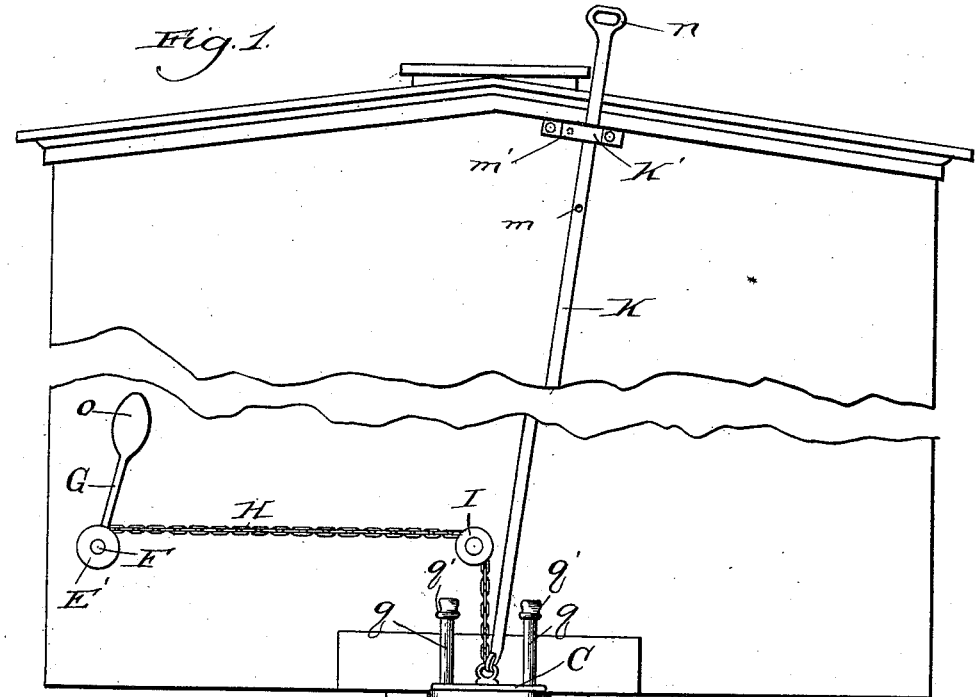
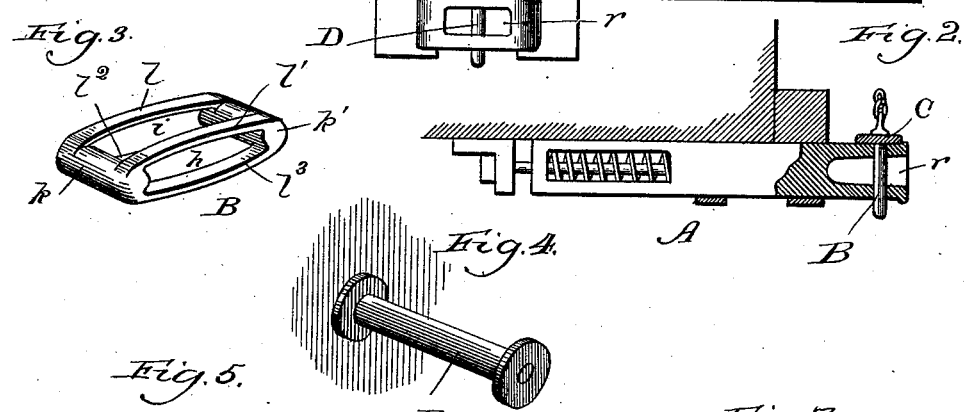
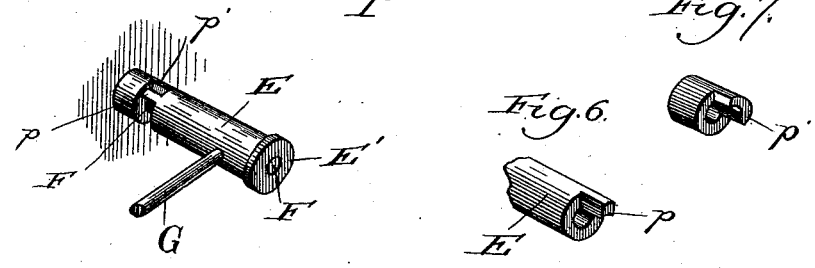
Witnesses:
Chas. E. Gaylord.
J. W. Dyrenforth.
Inventor:
George Kramer
By Dyrenforth & Dyrenforth
Attys.

UNITED STATES PATENT OFFICE.

GEORGE KRAMER, OF CHICAGO, ILLINOIS, ASSIGNOR OF ONE-FIFTH TO G. CHARLES WIELAND, OF SAME PLACE.

CAR-COUPLING.

SPECIFICATION forming part of Letters Patent No. 358,280, dated February 22, 1887.

Application filed November 16, 1886. Serial No. 219,050. (No model.)

*To all whom it may concern:*

Be it known that I, GEORGE KRAMER, a subject of the Emperor of Germany, residing at Chicago, in the county of Cook and State of Illinois, have invented a certain new and useful Improvement in Car-Couplings; and I hereby declare the following to be a full, clear, and exact description of the same.

It is my object to provide a form of car-coupling mechanism the use of which shall permit the operation of coupling and uncoupling cars to be performed without attendant danger of accident to the operator, and thus to be instrumental in obviating the disastrous consequences so frequently suffered by employés whose duty exposes them to great risk of life or limb, and in attending to which the list of killed and wounded, as statistics show, reached in the United States and Territories, in the single year of 1885, the appalling number of fifteen thousand.

I accomplish my object by means of a simple and effective coupling device, which is operated with ease and rapidity from the side or top of the car, and thus avoids the necessity on the part of the employé of going between cars; and my device also includes, as an indispensable adjunct to its effectiveness, a peculiar construction of coupling-link.

In the drawings, Figure 1 shows a freight-car minus the rolling-gear, in end elevation, and provided with my improvement. Fig. 2 is a broken view in side elevation, partly sectional, showing the draw-bar to be provided with the usual spring. Fig. 3 is an enlarged perspective view of the form of coupling-link for use with my improved coupling device; and Figs. 4, 5, 6, and 7, similar views showing details.

A is the draw-bar, of any of the usual forms as to its exterior, but having an opening, $r$, of a shape to accommodate the peculiar coupling-link, B, hereinafter described, and forming part of my invention.

The draw-bar of my improved device is provided upon its upper side, where it projects beyond the car, with two vertical posts, $q\ q$, forming guides for a metal plate, C, perforated near opposite ends to receive the posts, and at or near its center to admit the coupling-pin D through it into the opening commonly provided to receive it in the draw-head, the pin being, however, secured in the plate C, whereby raising the former likewise raises the latter, and shoulders $q'$ on the posts $q$ afford stops to the plate to prevent raising the latter sufficiently high to effect the withdrawal of the pin from its opening in the draw-bar.

E is a spool or hollow cylinder supported to be oscillated on a shaft, F, projecting horizontally from the end of the car near the right side of the same, and within easy reach from the ground, and provided with a head, E', to confine the spool E upon its support. The spool E has on its inner end a tongue forming a stop, $p$, and a similar stop, $p'$, in the form of a shoulder, is provided on the shaft or bearing F to oppose the spool E and thus limit its oscillations in either direction.

A lever, G, is secured at one end to the spool E, at a point to cause it to stand at an acute angle to the adjacent corner of the car, as shown in Fig. 1, when the stops $p$ and $p'$ are brought into contact with each other to lower the pin D, as and for the purpose hereinafter described, and the free end of the lever G is weighted, as shown at $o$, Fig. 1, the weight having a form, by preference, which permits it to be conveniently grasped in the hollow of the hand. The lever G is connected with the pin D by means of a suitable flexible connecting medium, preferably in the form of a chain, H, which passes over a roller, I, extending horizontally from the end of the car, and situated between the pin D and lever G. A rod or bar, K, is loosely connected at one end by a hook, as shown, or otherwise, with the pin D, extends upward and backward beyond the top of the car through a staple, K', secured in proper position upon the end of the car, and is provided at its upper end with a suitable handle, $n$. The rod K has an aperture, $m$, where it is supported on a pin, $m'$, (shown in dotted lines,) when raised to lift the pin in uncoupling the car from the top.

The coupling-link B must be, for my purpose, substantially of the form shown—that is to say, it must not hang, when in position in the socket $r$ of the draw-bar of a car, disconnected from another car, as do coupling-links of the form now in common use, but must always extend horizontally in line with the draw-bar socket of another car, to render the introduction into the latter of the link automatic, since, if this operation were not thus automatic, the manipulation of the coupling-pin from the side of the car, as hereinafter described, would be purposeless, the main object of the invention being, as already stated, to avoid the necessity on the part of employés of going between cars. The shape of the link B is elliptic longitudinally, in order to secure a close fit in the draw-bar socket $r$ and produce the normally horizontal position of the link hereinbefore described; and it comprises, as parts, the bars $l$ and $l'$ on the upper side, $l^2$ and $l^3$ on the under side, and heads $k$ and $k'$, respectively, at the opposite ends, affording the vertical longitudinal opening $i$ and the lateral longitudinal opening $h$ through the link to permit the necessary play when the coupling-pins D in the draw-bars on the adjacent ends of two cars are inserted through it; and the construction also makes the article yielding or compressible to permit its ready insertion into the draw-bars and produce the degree of rigidity of its position to render it normally horizontal.

The lateral opening $h$ forms a desirable feature in the link, by way of Providence, to permit the more important purpose of my invention—namely, of providing for the coupling and uncoupling of cars without requiring employés to go between them—to be accomplished in case a car provided with coupling mechanism in accordance with my invention shall require to be coupled to another having the old common form of coupling, comprising an oval or substantially oval link and pin. To allow the application, however, the draw-bar in such old form of coupling must be provided with a lateral opening to admit the coupling-pin from the side.

With the foregoing description of the parts of my improvement, the manner of operating the latter will be readily understood from the following: To withdraw a coupling-pin, D, in uncoupling, the weighted lever G is turned down, thereby lifting the pin out of coincidence with the link, where it is maintained by the weight $o$ and the effect of its leverage; or the uncoupling may be performed from the top of the car by means of the rod or bar K—when, of course, the lever device is not affected—which is sustained by hooking it upon the pin $m'$ at its opening $m$, provided at a point corresponding relatively to the normal position of the bar or rod K with the height to which the pin must be raised to free the link. To send the pin home in the operation of coupling, if performed from the top of a car, the rod or bar K is released from its support by the pin $m'$, when its own weight, together with that of the rod itself and the plate C—which, as hereinbefore stated, moves with the pin—force it into the desired position; or, if performed from the side of the car, the pin seeks its position of coupling upon releasing it from the effect of the weighted lever G by turning it to the position shown in Fig. 1, in which the stops $p$ and $p'$ permit it to incline sufficiently to remain unaffected, or practically so, by any jarring or bumping influence to which it is likely to be subjected.

It will thus be seen that my improvement is not only effective in its main purpose, above stated, but that by means of the same the operations of coupling and uncoupling may be easily, rapidly, and accurately performed.

What I claim as new, and desire to secure by Letters Patent, is—

1. The combination, with a car having a draw-bar, A, of a car-coupling having a guided pin, D, and an oscillatory weighted lever, G, supported on the car, near one side of the same, and connected with the pin, substantially as and for the purpose set forth.

2. The combination, with a car having a draw-bar, A, of a car-coupling having a pin, D, a plate, C, to which the pin is secured, guides $q$ on the draw-bar for the plate C, and an oscillatory weighted lever, G, supported on the car, near one side of the same, and connected with the pin, substantially as and for the purpose set forth.

3. The combination, with a car having a draw-bar, A, of a car-coupling having a guided pin, D, an oscillatory weighted lever, G, supported on the car, near one side of the same, and connected with the pin, and a rod or bar, K, connected near one end with the pin and extending therefrom near the top of the car, a staple, K', for the rod or bar K, and means, substantially as described, for sustaining the rod or bar K when raised to withdraw the pin, substantially as and for the purpose set forth.

4. A coupling-link, B, of elliptic form, substantially as and for the purpose set forth.

5. A coupling-link, B, hollow and provided with openings $i$ and $h$ and of elliptic form, substantially as and for the purpose set forth.

6. A coupling-link, B, comprising bars $l$, $l'$, $l^2$, and $l^3$ and heads $k$ and $k'$, substantially as and for the purpose set forth.

7. The combination, with a car having a draw-bar, A, of a car-coupling having a pin, D, a plate, C, to which the pin is secured, a guide on the draw-bar for the plate C, an oscillatory weighted lever, G, supported on the car, near one side of the same, and connected with the pin, and a compressible coupling-link, B, substantially as and for the purpose set forth.

8. The combination, with a car having a draw-bar, A, of a car-coupling having a pin, D, a plate, C, to which the pin is secured, a guide on the draw-bar for the plate C, an oscillatory weighted lever, G, supported on the car, near one side of the same, and connected with the pin, a rod or bar, K, connected near one end with the pin and extending therefrom near the top of the car, a staple, K', for the rod or bar K, means, substantially as described, for sustaining the rod or bar K when raised to withdraw the pin, and a compressible coupling-link, B, of elliptic form and provided with openings $i$ and $h$, substantially as and for the purpose set forth.

9. The combination, with a car having a draw-bar, A, of a car-coupling comprising a link, B, formed of bars $l$, $l'$, $l^2$, and $l^3$ and heads $k$ and $k'$, a pin, D, a plate, C, to which the pin is secured, guides $q$ on the draw-bar for the plate C, and having shoulders $q'$, a bearing, I, on the car, a shaft, F, having a stop, $p'$, and head E', and extending from the car, near one side of the same, a spool, E, on the shaft F, having a stop, $p$, a lever, G, secured to the spool and provided with a weight, $o$, a chain connecting the lever device with the pin and passing over the bearing I, a rod or bar, K, connected near one end with the pin and extending therefrom near the top of the car, a staple, K', on the car for the rod or bar K, and means, substantially as described, for sustaining the rod or bar K when raised to withdraw the pin, substantially as and for the purpose set forth.

GEORGE KRAMER.

In presence of—
G. CHARLES WIELAND,
J. W. DYRENFORTH.